United States Patent
Clegg et al.

(10) Patent No.: US 6,976,126 B2
(45) Date of Patent: Dec. 13, 2005

(54) ACCESSING DATA VALUES IN A CACHE

(75) Inventors: Christopher Michael Clegg, Cambridge (GB); Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 375 days.

(21) Appl. No.: 10/384,771

(22) Filed: Mar. 11, 2003

(65) Prior Publication Data

US 2004/0181631 A1 Sep. 16, 2004

(51) Int. Cl.$^7$ ............................................. G06F 12/00
(52) U.S. Cl. ................................... 711/128; 365/49
(58) Field of Search ........................... 711/128; 365/49

(56) References Cited

U.S. PATENT DOCUMENTS

| | | | |
|---|---|---|---|
| 6,560,679 B2 * | 5/2003 | Choi et al. ................... | 711/138 |
| 6,678,792 B2 * | 1/2004 | van de Waerdt ............ | 711/128 |
| 6,718,439 B1 * | 4/2004 | Jayavant ..................... | 711/136 |
| 2002/0087779 A1 * | 7/2002 | Zhang .......................... | 711/3 |
| 2002/0133672 A1 * | 9/2002 | Van De Waerdt et al. .. | 711/128 |
| 2004/0010675 A1 * | 1/2004 | Moritz ......................... | 711/202 |
| 2004/0030838 A1 * | 2/2004 | Van De Waerdt ........... | 711/137 |

\* cited by examiner

Primary Examiner—Matthew Kim
Assistant Examiner—Woo H. Choi

(57) ABSTRACT

The present invention provides an apparatus and method for accessing data values in a cache and in particular accessing data values in an 'n' way set associative cache. A data processing apparatus is provided comprising an 'n' way set-associative cache, each cache way having a plurality of entries for storing a corresponding plurality of data values. A cache controller is provided which is operable on receipt of an access request for a data value to determine whether that data value is accessible within the cache, the cache comprising cache access logic operable under the control of the cache controller to determine whether a data value the subject of an access request is accessible in one of the cache ways. Also provided is a way lookup cache arranged to store an indication of the cache way in which a number of the plurality of data values stored in the cache are accessible. The cache controller is operable, when an access request for a data value specifies a non-sequential access, to reference the way lookup cache to determine whether that data value is identified in the way lookup cache and, if so, the cache controller being further operable to suppress the operation of the cache access logic and to cause that data value to be accessed. The provision of a way lookup cache enables the power consumption of the cache to be reduced by enabling the operation of the cache access logic to be suppressed.

32 Claims, 7 Drawing Sheets

ACCESSING DATA VALUES IN A CACHE

BACKGROUND OF THE INVENTION

1. Field of the Invention

The present invention relates to an apparatus and method for accessing data values in a cache and in particular for accessing data values in an 'n' way set associative cache.

2. Description of the Prior Art

A cache may be arranged to store data and/or instructions so that they are subsequently readily accessible by a processor. Hereafter, the term "data value" will be used to refer to both instructions and data. The cache will store the data value associated with a memory address until it is overwritten by a data value for a new memory address required by the processor. The data value is stored in cache using either physical or virtual memory addresses. Should the data value in the cache have been altered then it is usual to ensure that the altered data value is re-written to the memory, either at the time the data is altered or when the data value in the cache is overwritten.

A number of different configurations have been developed for organising the contents of a cache. One such configuration is the so-called 'low associative' cache. In an example 16 Kbyte low associative cache such as the 4-way set associative cache, generally 90, illustrated in FIG. 1, each of the 4 cache ways 50, 60, 70, 80 contain a number of cache lines 55. A data value (in the following examples, a word) associated with a particular address can be stored in a particular cache line of any of the 4 cache ways (i.e. each set has 4 cache lines, as illustrated generally by reference numeral 95). Each cache way stores 4 Kbytes (16 Kbyte cache/4 cache ways). If each cache line stores eight 32-bit words then there are 32 bytes/cache line (8 words×4 bytes/word) and 128 cache lines in each cache way ((4 Kbytes/cache way)/(32 bytes/cache line)). Hence, in this illustrative example, the total number of sets would be equal to 128, i.e. 'M' would be 127.

The contents of a memory address 47 associated with each data value is also illustrated in FIG. 1. The memory address 47 consists of a TAG portion 10, and SET, WORD and BYTE portions 20, 30 and 40, respectively. The SET portion 20 of the memory address 47 is used to identify a particular set within the cache 90. The WORD portion 30 identifies a particular word within the cache line 55, identified by the SET portion 20, that is the subject of the access by the processor, whilst the BYTE portion 40 allows a particular byte within the word to be specified, if required.

A word stored in the cache 90 may be read by specifying the memory address 47 of the word and by selecting the cache way which stores the word (the TAG portion 10 is used to determine in which cache way the word is stored, as will be described below). A logical address 45 (consisting of the SET portion 20 and WORD portion 30) then specifies the logical address of the word within that cache way. A word stored in the cache 90 may be overwritten to allow a new word for an address requested by the processor to be stored. Typically, when storing words in the cache 90, a so-called "linefill" technique is used whereby a complete cache line 55 of, for example, 8 words (32 bytes) will be fetched and stored.

FIG. 2 provides a schematic view of cache way 0 of cache 90. Each entry 130 in a TAG memory 115 is associated with a corresponding cache line 55 in a data memory 117, each cache line containing a plurality of data values. A cache controller (not shown) determines whether the TAG portion 10 of the memory address 47 issued by a processor (not shown) matches the TAG in one of the TAG entries 130 of the TAG memory 115 of any of the cache ways. If a match is found then the data value in the corresponding cache line 55 for that cache way identified by the SET and WORD portions 20, 30 of the memory address 47 will be output from the cache 90, assuming the cache line is valid (the marking of the cache lines as valid is discussed below).

In addition to the TAG stored in a TAG entry 130 for each cache line 55, a number of status bits (not shown) are preferably provided for each cache line. Preferably, these status bits are also provided within the TAG memory 115. Hence, associated with each cache line, are a valid bit and a dirty bit. As will be appreciated by those skilled in the art, the valid bit is used to indicate whether a data value stored in the corresponding cache line is still considered valid or not. Hence, setting the valid bit will indicate that the corresponding data values are valid, whilst clearing the valid bit will indicate that at least one of the data values is no longer valid.

Further, as will be appreciated by those skilled in the art, the dirty bit is used to indicate whether any of the data values stored in the corresponding cache line are more up-to-date than the data value stored in a memory (not shown). The value of the dirty bit is relevant for write back regions of memory, where a data value output by the processor core and stored in the cache 90 is not immediately also passed to the memory for storage, but rather the decision as to whether that data value should be passed to memory is taken at the time that the particular cache line is overwritten, or "evicted", from the cache 90. Accordingly, a dirty bit which is not set will indicate that the data values stored in the corresponding cache line correspond to the data values stored in memory, whilst a dirty bit being set will indicate that at least one of the data values stored in the corresponding cache line has been updated, and the updated data value has not yet been passed to the memory.

In a typical prior art cache, when the data values in a cache line are overwritten in the cache, they will be output to memory for storage if the valid and dirty bits indicate that the data values are both valid and dirty. If the data values are not valid, or are not dirty, then the data values can be overwritten without the requirement to pass the data values back to memory.

The arrangement of cache 90 is shown in more detail in FIG. 3. The cache 90 has four cache ways and comprises the data memory 117 and a multiplexer 119. Because data values can be stored in any of the cache ways, additional cache access logic is also provided which enables the cache 90 to access data values from any of those cache ways. Hence, the cache access logic comprises the TAG memory 115, a comparator 111 associated with each cache way and a cache way selector 113. Whilst a single cache 90 is shown in FIG. 3 which stores both data and instructions, it will be appreciated that in some architectures, such as the so-called 'Harvard' architecture, two separate caches are provided with instructions and data being stored in the separate caches.

When an access request such as a read or a write is issued by the processor core, the memory address 47 of the data value to be accessed is placed on a processor address bus 54. The memory address 47 is received by the cache 90 from the processor address bus 54.

As explained above, data values are associated with memory addresses 47 and each of those data values may be accessed. In general, sequential access requests are requests which specify a data value which is in the same cache line as a data value which was the subject of the immediately preceding access request to that cache, whereas non-sequential access requests are those which specify a data value which is in a different cache line to a data value which was the subject of the immediately preceding access request to that cache.

However, in order to provide a convenient trade-off between performance and resources required to establish whether an access is sequential or non-sequential, previous ARM cores have adopted the following simple rule-set to establish whether an access request is sequential or non-sequential. Instruction accesses and data accesses are treated separately. For instruction accesses, if the instruction is a branch instruction or results in the value stored in the program counter being modified then it is assumed that the immediately following access is non-sequential, otherwise it is assumed that the immediately following access is sequential. For data accesses, if the access is the second or subsequent access of a multiple load or store instruction then it is assumed that the access is sequential, otherwise it is assumed that the access is non-sequential. However, for both instruction and data accesses, if the access is to the first word of a cache line then irrespective of the outcome of the preceding rules, it is assumed that the access is non-sequential.

If the access request is determined to be a non-sequential access request then the cache access logic is utilised to access each of the cache ways of the cache 90. Further examples of non-sequential access requests are access requests for a data value where that data value is stored in a different cache way, set or cache line to the immediately preceding data value accessed.

In these circumstances, for an example read operation, the cache access logic is employed. TAG memory 115 in each cache way receives the memory address 47. The TAG memory 115 outputs the TAG value stored at the location specified by SET portion 20 of the memory address 47 to the associated comparator 111. Each comparator 111 then compares the TAG value output from that cache way with the TAG portion 10 of the memory address 47 placed on the processor address bus 54.

The data memory 117 in each cache way also receives the memory address 47. The data memory 117 outputs the data value stored at the location specified by the SET portion 20, WORD portion 30 and BYTE portion 40 of the address 47 to the multiplexer 119.

If the TAG value and TAG portion 10 match then a hit signal (e.g. logic '1') is sent to the cache way selector 113. The cache way selector 113 then indicates a cache hit on path 120 to a cache controller (not shown) and outputs a select signal to multiplexer 119. The multiplexer 119 then selects and outputs the corresponding data value onto the processor data bus 56. Hence, the processor core 10 is provided with the data value directly from the cache 90.

If the TAG value and TAG portion 10 do not match then a miss signal (e.g. logic '0') is sent to the cache way selector 113. The cache way selector 113 then indicates a cache miss by supplying an appropriate signal on path 120 and the data value will be read from memory and stored in the cache 90. Hence, the processor core is provided with the data value over the data bus 56 following a delay while it is read from memory and the data value and TAG value are stored in the cache 90 which overwrites a data value and TAG value previously stored in the cache 90. As explained previously, it would be typical for a linefill of the complete cache line to be performed, where a complete cache line, including the data value indicated by the access request is read from memory and stored in the cache 90, thereby overwriting a whole cache line previously stored in the cache 90.

Should a sequential access take place then preferably the cache way selection associated with the immediately preceding data access will be retained and the multiplexer 119 continues to select that cache way and to output the data value the subject of the sequential access onto the processor data bus 56 without the need to utilise the cache access logic.

It will be appreciated that handling access requests can result in significant power being consumed by the cache 90. Consuming significant power causes cooling difficulties and complicates chip layout. In battery or low power applications, this significant power consumption also results in shorter battery life.

It is an object of the present invention to provide a technique which reduces the power consumption of a cache when responding to access requests.

SUMMARY OF THE INVENTION

According to a first aspect of the present invention there is provided a data processing apparatus comprising: an 'n' way set-associative cache, each cache way having a plurality of entries for storing a corresponding plurality of data values; a cache controller operable on receipt of an access request for a data value to determine whether that data value is accessible within the cache, the cache comprising cache access logic operable under the control of the cache controller to determine whether a data value the subject of an access request is accessible in one of the cache ways; a way lookup cache arranged to store an indication of the cache way in which a number of the plurality of data values stored in the cache are accessible; and the cache controller being operable, when an access request for a data value specifies a non-sequential access, to reference the way lookup cache to determine whether that data value is identified in the way lookup cache and, if so, the cache controller being further operable to suppress the operation of the cache access logic and to cause that data value to be accessed.

Hence, for non-sequential accesses, a way lookup cache is utilised. The way lookup cache can provide an indication of the cache way storing the requested data value instead of this being provided by the cache access logic. When the way lookup cache provides such an indication, it will be appreciated that the operation of the cache access logic can be suppressed. By suppressing the operation of the cache access logic, the power consumption of the cache is reduced. Accordingly, the power consumption of the cache can be reduced whilst still responding to access requests.

Accordingly, it will be appreciated that the introduction of the way lookup cache enables non-sequential accesses to take place in a similar manner to sequential accesses. Given that sequential access consumes less power than non-sequential accesses because the cache access logic need not be utilised, the power consumed during non-sequential accesses can be reduced significantly.

Preferably, when an access request for a data value specifies a non-sequential access, the cache controller is further operable to cause that data value to be accessed in the cache way identified by the way lookup cache.

Hence, the way lookup cache can provide an indication of the cache way storing the data value without needing to utilise the cache access logic and the data value can be accessed in the cache way identified by the way lookup cache.

Preferably, when the data value is identified in the way lookup cache, the cache controller is operable to cause only the cache way identified by the way lookup cache to be accessed.

Hence, by only accessing the cache way identified by the way lookup cache instead of accessing all the cache ways, it will be appreciated that the power consumption of the cache can be further reduced.

Preferably, each of the number of the plurality of data values is associated with an entry in the way lookup cache, each entry including an indication of the cache way storing the data value, the cache controller being operable to determine whether the access request specifies a data value associated with an entry in the way lookup cache and, if so, to cause that data value to be accessed.

Providing such a simple structure enables the way lookup cache to be easily implemented, and minimises the chip area required and power consumed by the way lookup cache. It will be appreciated that the indication of the cache way may be in any suitable form which allows the cache controller to readily determine the cache way identified by the way lookup cache.

Preferably, the access request specifies a memory address for the data value, each entry includes an indication of a memory address and the cache controller is operable to determine whether the memory address specified by the access request corresponds to a memory address indication of an entry in the way lookup cache and, if so, to cause the data value associated with the memory address to be accessed in the cache way identified by the entry.

Hence, through a simple comparison of the address associated with the access request with those addresses associated with entries in the way lookup cache, the cache controller can readily determine whether there is a matching entry in the way lookup cache, and in such cases identify the cache way of the data value to be accessed.

It will be appreciated that the indication of the memory address may be in any suitable form, such as, for example, the TAG portion of the address.

In one embodiment, each entry includes an indication of a data value associated with a memory address and the cache controller is operable when the access request specifies a memory address associated with a data value of an entry in the way lookup cache to cause the data value associated with the memory address to be accessed in that entry of the way lookup cache and to suppress the operation of the set-associative cache.

Hence, when an access request is received and it is determined that the data value the subject of the access request is stored in the way lookup cache, the data value is accessed directly in the way lookup cache instead of having to access the cache. Because the data value is provided to the processor accessed directly in the way lookup cache, the operation of the cache itself can be suppressed. It will be appreciated that suppressing the operation of the cache enables a further reduction in power consumption.

It will be appreciated that in embodiments where the address indication is the TAG portion of the memory address, the way lookup cache can be arranged to store consistently any one of the data values associated with that TAG portion (i.e. the same one of any of the data values of that cache line). With this arrangement, the cache controller determines which of the data values to be stored. In preferred embodiments, the first data value of the cache line is stored in the entry of the way lookup cache.

In embodiments, the 'n' way set-associative cache comprises 'm' sets and the way lookup cache comprises up to $'m'/2^{-x}$ entries, where 'x' is a positive integer.

Preferably, the 'n' way set-associative cache comprises 'm' sets and the way lookup cache comprises 'm' entries.

It has been found that providing a number of entries equal to the number of sets in the set-associative cache provides a convenient balance in the trade-off between the likelihood of a cache hit occurring in the way lookup cache, reducing power consumption and the additional chip area overhead incurred.

Preferably, if the cache controller determines that the data value is not identified in the way lookup cache, the cache controller is operable to control the cache access logic to determine whether the data value is accessible in one of the cache ways and, if so, to store in one of the entries in the way lookup cache an indication of the cache way in which the data value is accessible.

Accordingly, entries in the way lookup cache can be maintained to contain details of the most recently accessed data values. It will be appreciated that many different update schemes could be employed when maintaining to the way lookup cache.

Preferably, the cache controller is further operable to store in the one of the entries of the way lookup cache a memory address indication associated with the data value.

It will be appreciated that the indication of the memory address may be in any suitable form, such as, for example, the TAG portion of the address.

Preferably, the cache controller is further operable to store in the one of the entries of the way lookup cache an indication of the data value.

It will be appreciated that the indication of the data value may be in any suitable form.

Preferably, the data processing apparatus is operable to provide the cache controller with an indication of whether the access request for a data value specifies a non-sequential access.

Hence, on receipt of an indication from, for example, a processor core, that a non-sequential access is taking place, the cache controller can refer to the way lookup cache to determine whether the cache way storing the data value to be accessed is identified therein.

Alternatively, the cache controller is operable to compare the access request with the preceding access request to determine whether the access request for a data value specifies a non-sequential access.

Accordingly, the cache controller can determine whether a sequential or non-sequential access is taking place without the need for further information and hence determine whether or not to refer to the way lookup cache.

Preferably, the access request specifies a memory address and a data value size and the cache controller is operable to compare the memory address and the data value size with the preceding access request and data value size to determine whether the access request for a data value specifies a non-sequential access.

The data value size specifies the size of the data value to be accessed (e.g. byte, word, double word etc.). It will be appreciated that comparing the memory addresses and data value size of the access request with the immediately preceding access request to the same cache can enable the cache controller to quickly and easily determine whether a non-sequential or a sequential access is occurring.

In embodiments, each cache way comprises a plurality of cache lines and the cache controller is operable to determine that the access request is a non-sequential access if the access request comprises an access to a cache line which is different to a cache line accessed by the preceding access request.

Accordingly, if an access request is to a different cache line to the immediately preceding cache line then the cache controller will treat the access request as a non-sequential access.

Preferably, the cache controller comprises a register operable to store the cache way identified by the way lookup cache, the cache controller being further operable when an access request for a data value specifies a sequential access, to reference the register, to suppress the operation of the access logic and to cause that data value to be accessed in the cache way identified by the register.

Hence, in sequential accesses, the cache way identified by the way lookup cache may be further utilised without the need to activate the cache access logic and/or the other cache ways.

Viewed from a second aspect, the present invention provides in a data processing apparatus comprising: an 'n' way set-associative cache, each cache way having a plurality of entries for storing a corresponding plurality of data values; a cache controller operable on receipt of an access request for a data value to determine whether that data value is accessible within said cache, said cache comprising cache access logic operable under the control of said cache controller to determine whether a data value the subject of an access request is accessible in one of said cache ways; and a way lookup cache arranged to store an indication of the cache way in which a number of said plurality of data values stored in said cache are accessible, a method of accessing a data value comprising the steps of: a) determining whether an access request for a data value specifies a non-sequential access and, if so; b) referencing said way lookup cache to determine whether that data value is identified in said way lookup cache and, if so; c) suppressing the operation of said access logic and causing that data value to be accessed.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 4A:
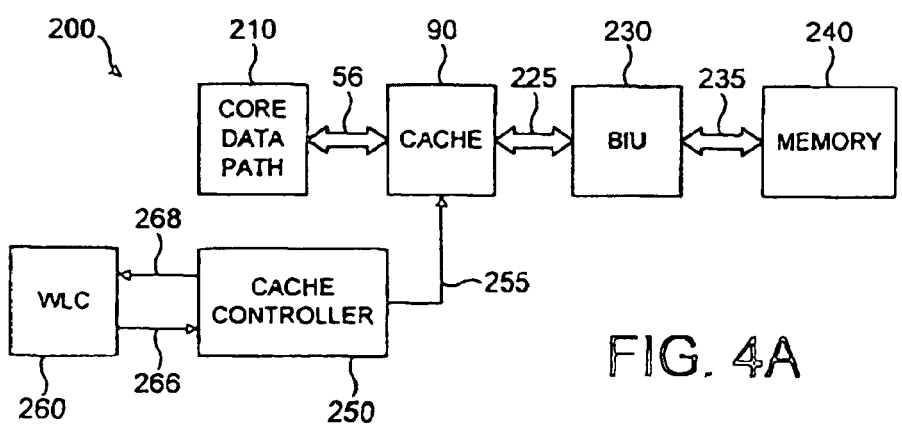
FIG. 4A illustrates the arrangement of a data processing apparatus according to a first embodiment of the present invention which incorporates a first embodiment of the way lookup cache.
Figure 4B:
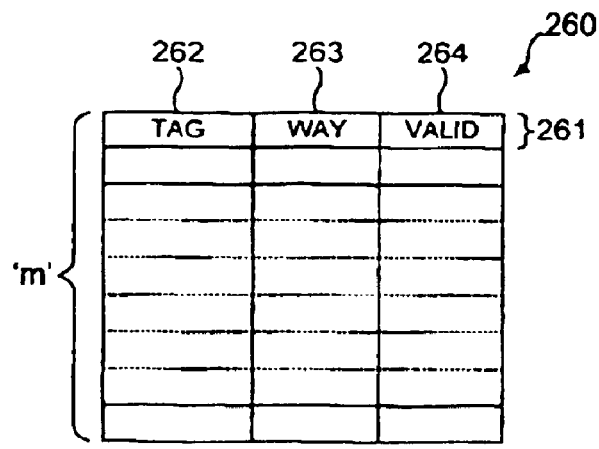
FIG. 4B illustrates the arrangement of the first embodiment of the way lookup cache.
Figure 6:
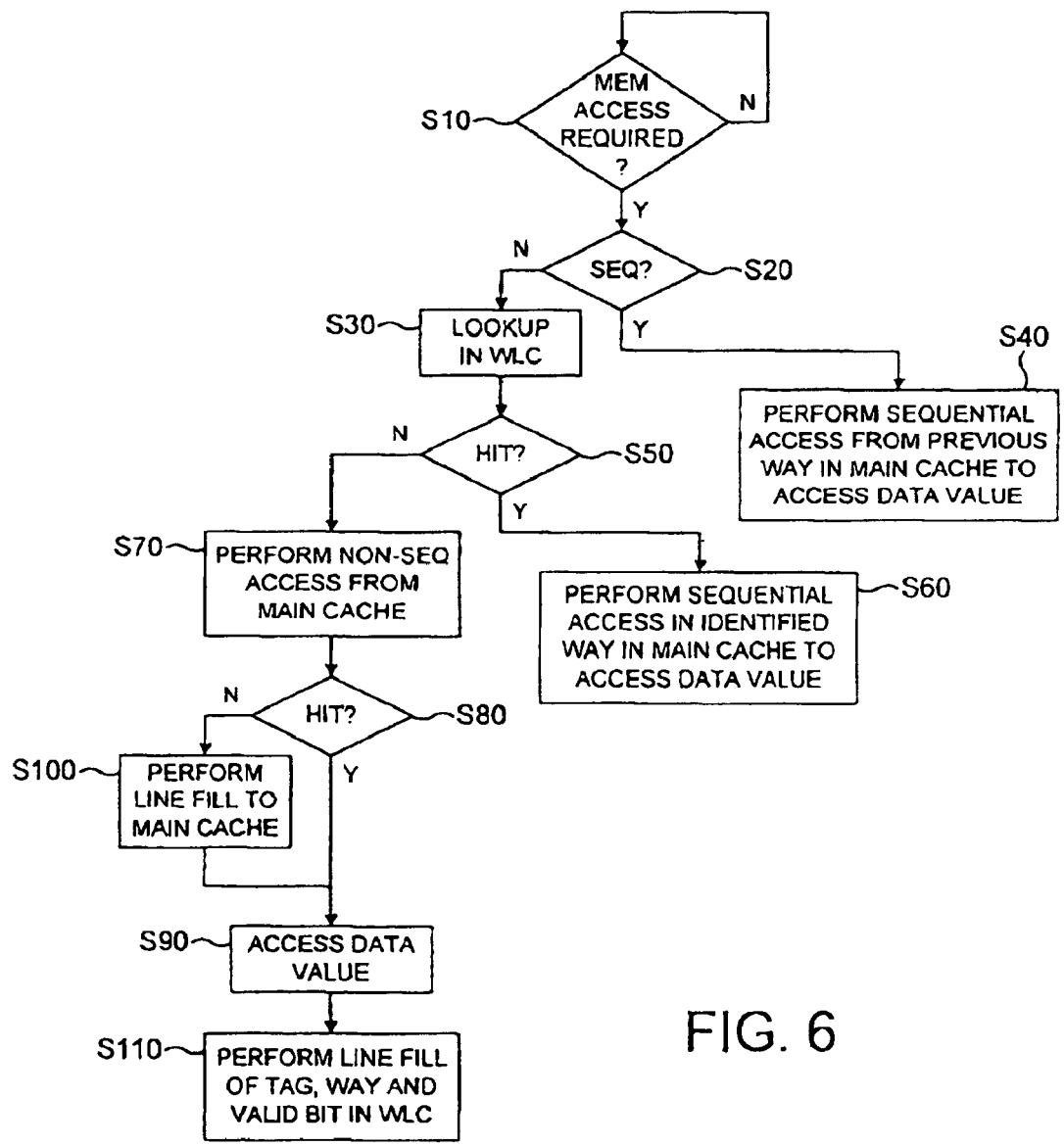
FIG. 6 is a flow diagram illustrating the operation of the data processing apparatus of FIG. 4A in response to an access request.

FIGS. 4A, 4B and 6 illustrate the arrangement and operation of a first embodiment of the present invention incorporating a way lookup cache. A data processing apparatus, generally 200, has a core data path 210 arranged to process instructions received from a memory 240. Data values required by the core data path 210 for processing those instructions may also be retrieved from the memory 240. The cache 90 is provided for storing data values (which may be data and/or instructions) retrieved from the memory 240 so that they are subsequently readily accessible by the core data path 210.

Figure 1:
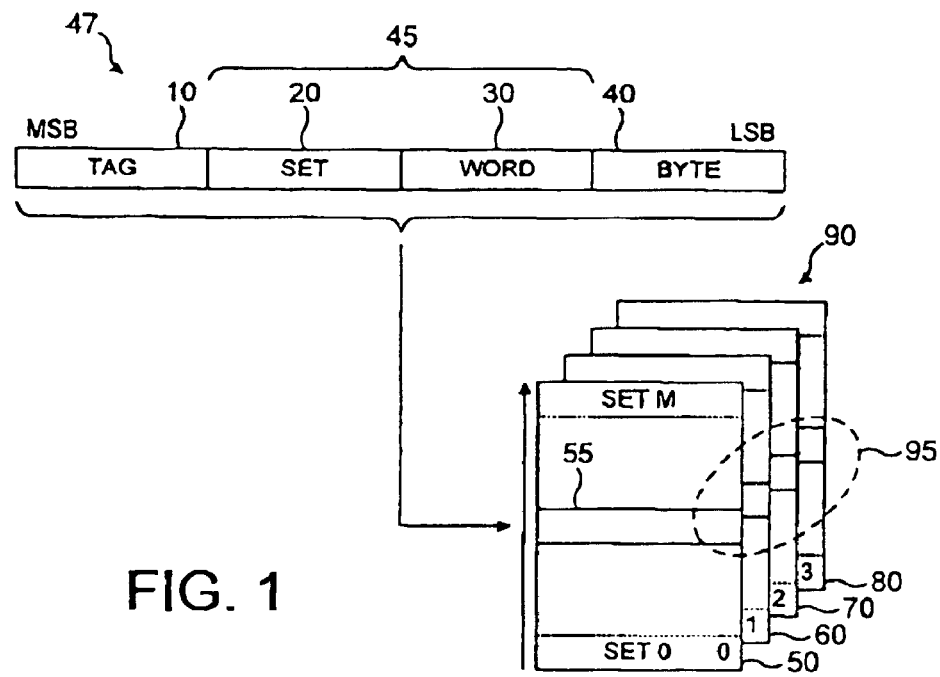
FIG. 1 illustrates an example prior art 4-way set associative cache.
Figure 2:
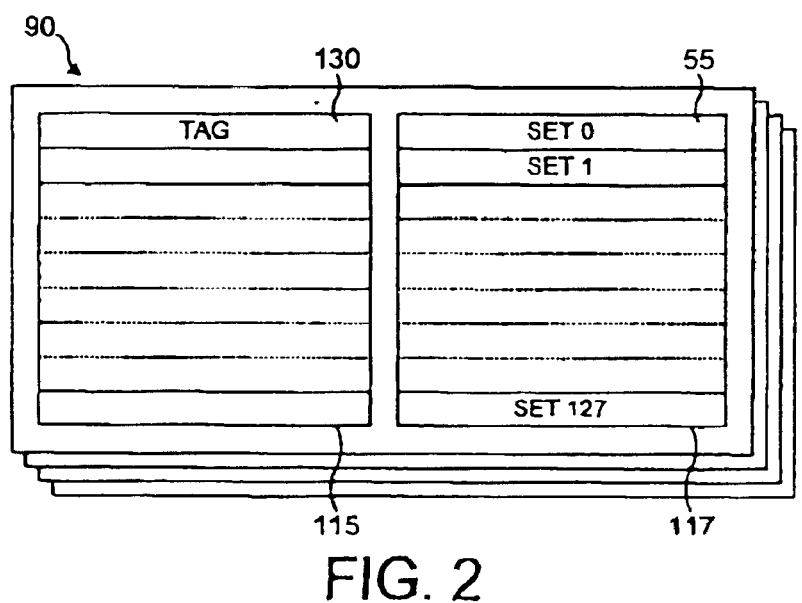
FIG. 2 illustrates features of one way of the prior art cache of FIG. 1.
Figure 3:
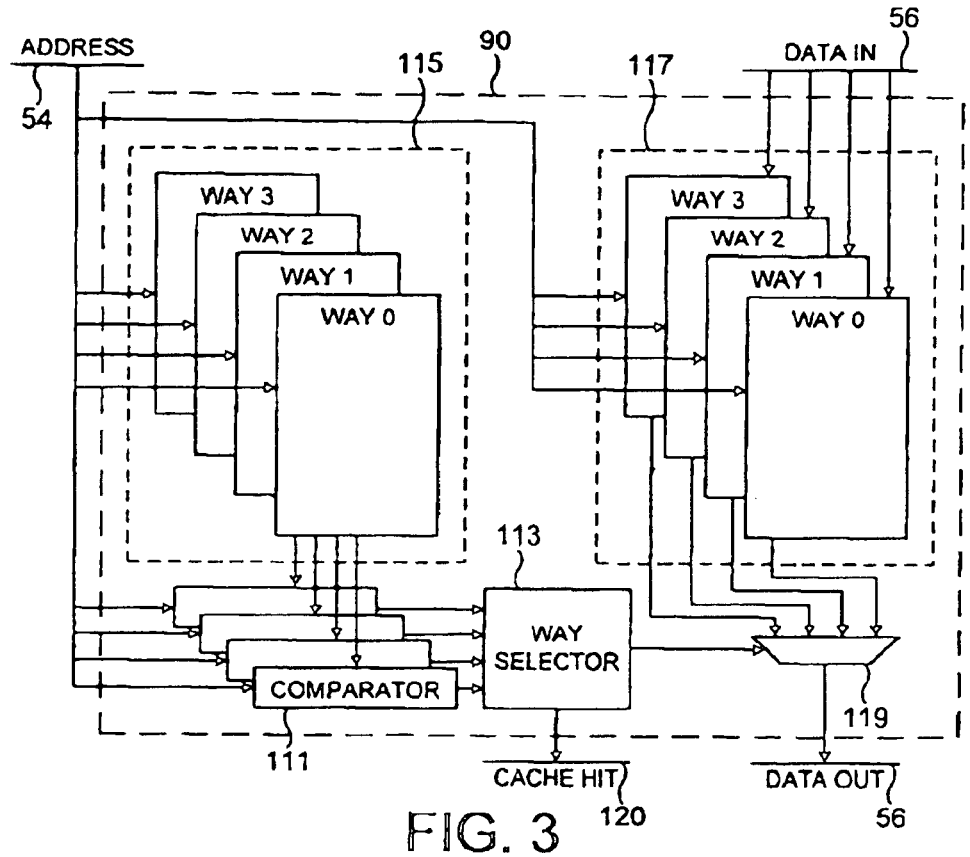
FIG. 3 illustrates features of the prior art cache of FIG. 1 when incorporated in a data processing apparatus.

A bus interface unit (BIU) 230 is provided which is used to retrieve and store data values between the cache 90 and the memory 240. For example, should there be a cache miss (indicated by a signal on path 120 of FIG. 3—e.g. signal "low" indicates a cache miss, signal "high" indicates cache hit), the BIU 230 will initiate a read from the memory 240. The memory 240 then outputs on bus 235 the data value at the address specified. The BIU 230 will then pass the data value from bus 235 to bus 225, where it can be stored in the cache 90 and read over bus 56 by the core data path 210. Subsequently, that data value can readily be accessed directly from the cache 90 by the core data path 10.

The cache 90 typically comprises a number of cache lines, each cache line being arranged to store a plurality of data values. When a data value is retrieved from memory 240 for storage in the cache 90, then in preferred embodiments a number of data values are retrieved from memory in order to fill an entire cache line, this technique often being referred to as a "linefill". In preferred embodiments, such a linefill results from the core data path 210 requesting a cacheable data value that is not currently stored in the cache 90, this invoking the memory read process described above. It will be appreciated that in addition to performing linefills on a read miss, linefills can also be performed on a write miss, depending on the allocation policy adopted.

A cache controller 250 controls the storage of data values in the cache 90 and controls the retrieval of the data values from the cache 90. Whilst it will be appreciated that a data value may be of any appropriate size, for the purposes of the preferred embodiment description it will be assumed that each data value is one word (32 bits) in size.

Coupled to the cache controller 250 is a way lookup cache 260 as illustrated in more detail in FIG. 4B. The way lookup cache 260 has a number of entries. The number of entries is preferably set to be equal to the number of sets in the cache 90. Hence, for a 'n' way set associative cache 90 having 'm' sets, the number of entries in the way lookup cache 260 is set to 'm'. However, it will be appreciated that the number of entries may be adjusted depending on the particular design constraints to be any of 'm'/$2^x$' entries, where 'x' is a positive integer. Each entry 261 in the way lookup cache 260 is associated with a data value. Each entry 261 has a TAG field 262, a cache way field 263 and a valid bit field 264. The TAG 262 field stores the TAG portion 10 of the memory address 47 of the data value associated with that entry. The cache way field 263 stores a number indicating the cache way storing that data value. The valid bit indicates whether that particular entry in the way lookup cache 260 is valid or not.

The operation of the data processing apparatus 200 incorporating the way lookup cache 260 when responding to an access request will now be explained with reference to FIG. 6.

At step S10, a memory access request is awaited. When the core data path 210 requires to access a data value, it initiates an access request by placing the memory address 47 of the data value on the processor address bus 54 of FIG. 3 and a control signal on a control bus (not shown). The control bus carries information such as whether the request specifies instruction or data, read or write and data value size information such as whether the request specifies a word, half word or byte. On receipt of the memory access request processing proceeds to step S20.

At step S20, it is determined whether or not the memory access request is a sequential or non-sequential memory access. In this embodiment, the core data path 210 provides to the cache controller 250 over a path (not shown) an indication of whether the memory access request is sequential or non-sequential in accordance with the rule-set described above.

However, it will be appreciated that in an alternative embodiment the cache controller 250 could instead determine whether the memory access request is sequential or non-sequential by providing a previous address register, a previous data value size register and a previous cache way register. The previous address register stores the memory address 47 and the previous data value size register stores information specified by the control signal (such as whether the access request is for a word, half word, byte, double word, etc.) for the previous or immediately preceding access request to that cache. These two registers can then be used to determine whether or not a particular access request is sequential or non-sequential. The previous cache way register stores a cache way indication provided by the way lookup cache 260 for the previous or immediately preceding access request to that cache. This register can then be used when dealing with sequential access requests.

When the above-described registers are provided, the memory address and data value size of the current or present access request is compared with the contents of the previous address register and the previous data value size register. If the registers have no contents, such as would occur on a first access request then that access request is a non-sequential access request and processing would proceed to step S30. In all other circumstances, if the comparison indicates a sequential access then processing would proceed to step S40, otherwise, a non-sequential access is assumed and processing proceeds to step S30.

As mentioned above, in this embodiment, the core data path 210 provides to the cache controller 250 over a path (not shown) an indication of whether the memory access request is sequential or non-sequential. If the indication is a non-sequential access request then processing proceeds to step S30. If the indication is a sequential access request then processing proceeds to step S40.

At step S40, the cache controller 250 controls a sequential access to the cache 90. In this embodiment, each component of the cache access logic (e.g. each way of the TAG memory 115, each of the comparators 111 and the cache way selector 113) has an enable input (not shown). When the enable input is set the components are energised and operate. Conversely, when the enable input is cleared the components cease to operate. Each way of the data memory 117 also has an enable input and these are driven by the output of the way selector 113 such that only the selected way operates. When the enable input of the cache way selector 113 is cleared, the output provided by the cache way selector 113 is maintained such that the currently selected way continues to operate. Hence, at step S40, the cache controller 250 causes the enable inputs to the cache access logic to be cleared and the enable input of the currently selected way is maintained.

It will be appreciated that in embodiments which utilised the previous way register then, at step S40, the cache controller 250 could control a sequential access to the cache 90 in the cache way identified by the previous way register. The cache controller 250 would send a signal over path 255 to the cache 90 to suppress the operation of the cache access logic and the cache ways not identified by the previous way register by causing their enable inputs to be cleared.

In either case, the cache 90 receives the memory address 47 of the data value to be accessed from the processor address bus 54. The SET, WORD and BYTE portions 20, 30, 40 of the memory address 47 identifies a data value in the cache way of the data memory 117, which is accessed by the core data path 210 over the data bus 56. It will be appreciated that in a read operation, the data value is provided to the core data path 210 from the cache 90 over the data bus 56. Whereas, in a write operation, the data value is provided to the cache 90 from the core data path 210 over the data bus 56. Processing returns to step S10 to await the next memory access request.

At step S30, for non-sequential access requests, the TAG portion 10 and SET portion 20 of the memory address 47 of the data value to be accessed are passed to the way lookup cache 260 over path 268. The SET portion 20 specifies an entry in the way lookup cache 260 and the TAG field 262 of that entry is compared with the TAG portion 10 of the memory address 47 and processing proceeds to step S50.

At step S50, it is determined whether or not the TAG field 262 of that entry in the way lookup cache matches the TAG portion 10 of the memory address 47. If a match occurs and the valid bit for that entry is set then a 'hit' has occurred and processing proceeds to step S60. If no match occurs or if a match occurs and the valid bit is not set then a 'miss' has occurred and processing proceeds to step S70.

At step S60, when it is determined that the cache way of the data value to be accessed is stored in the way lookup cache 260, the contents of the cache way field 263 of the matching entry are passed from the way lookup cache 260 to the cache controller 250 over path 266. Where a previous cache way register is provided, the contents of the cache way field 263 are then stored in the previous cache way register. The cache controller 250 causes the enable inputs to the cache access logic to be cleared and forces the output of the cache way selector 113 to correspond to the cache way indicated by the contents of the matching cache way field 263 such that only that cache way operates. The cache 90 receives the memory address 47 of the data value to be accessed from the processor address bus 54. The SET, WORD and BYTE portions 20, 30, 40 of the memory address 47 identifies a data value in the cache way of the data memory 117 identified by the way lookup cache 260, which is accessed by the core data path 210 over the data bus 56. It will be appreciated that in a read operation, the data value is provided to the core data path 210 from the cache 90 over the data bus 56. Whereas, in a write operation, the data value is provided to the cache 90 from the core data path 210 over the data bus 56. Processing returns to step S10 to await the next memory access request.

At step S70, when it is determined that the cache way of the data value to be accessed is not stored in the way lookup cache 260, then the cache controller 250 causes a non-sequential access to the cache 90 and the enable inputs to the cache access logic are set. Accordingly, the TAG memory 115 and data memory 117 in each cache way receives, from the core data path 210, the memory address 47 of the data value to be accessed. The TAG memory 115 outputs the TAG value stored at the location specified by SET portion 20 of the memory address 47 to the associated comparator 111.

Each comparator 111 then compares the TAG value output from that cache way with the TAG portion 10 of the memory address 47 placed on the processor address bus 54 and processing proceeds to step S80.

At step S80 it is determined whether or not a hit has occurred when accessing the cache 90. If the TAG value and TAG portion 10 match and the valid bit is set then a hit signal (e.g. a logic '1') is sent to the way selector 113. The way selector 113 then indicates a cache hit on path 120 to the cache controller 250. Processing then proceeds to step S90 if a hit occurs or to step S100 if a miss occurs.

The following assumes a linefill is performed to the cache 90 on a miss during read or write. However, it will be appreciated that the linefill could be omitted during write and instead the data value could be written directly to memory 240.

At step S100, the BIU 230 will initiate a linefill from the memory 240. The memory 240 then outputs on bus 235 all the data values for the cache line which includes the address specified. The cache controller 250 will determine in which cache way the linefill is to occur in accordance with well-known cache fill policies. The BTU 230 will then pass these data values from bus 235 to bus 225, where they are stored in the cache 90.

For a read operation, the data value requested is placed on the data bus 56 and over path 268 in parallel with the linefill operation and processing proceeds to step S90 where the data value is accessed.

At step S90, the data value is accessed.

For a read operation, the data value on the data bus 56 is accessed by the core data path 210.

For a write operation, an entry in the data memory 117 to store the data value is identified by the SET portion 20, WORD portion 30 and BYTE portion 40 of the address 47 in the cache way identified by the way selector 113. The data value is then written to the entry in the identified cache way.

Processing then proceeds to step S110 where details of the data value accessed are stored in the way lookup cache 260.

At step S110, the cache controller 250 performs a linefill to the way lookup cache 260. The linefill causes data to be entered in the TAG field 262, the cache way field 263 and the valid bit field 264 of one of the entries 261. In embodiments where the number of entries in the way lookup cache 260 equals the number of SETs in each cache way, the data can only be stored in the entry of the way lookup cache 260 which corresponds to the SET portion 20 of the memory address 47 of the data value being accessed. Once the entry is selected, the TAG portion 10 of the memory address 47 of the data value accessed is written to the TAG field 262. Also, the cache way selected by the cache controller to store that data value is written to the cache way field 263. The valid bit field 264 for that entry is set. The valid bit field 264 will remain set and will only be cleared by a cache flush. Processing returns to step S10 to await the next memory access request.

Whilst, when at step S80 it is determined that a cache miss has occurred when accessing the cache 90, the subsequent steps S100, S90 and S110 are illustrated as being sequential, it will be appreciated that because the data value is made available to the data bus 56 and passed to the way lookup cache 260 in parallel with the linefill occurring, then steps S90 and S110 need not be subsequent steps but could instead occur at the same time at step S100.

FIGS. 5A, 5B, 7A, 7B and 7C illustrate the arrangement and operation of a second embodiment of the present invention incorporating the way lookup cache 360. A data processing apparatus, generally 300, has an arrangement identical to that of the previous embodiment with the exception of having an enhanced way lookup cache 360 which is arranged to store data values and an additional data path 366 direct from the way lookup cache 360 to the core data path 210 which is operable to provide those data values to and from the core data path 210.

Figure 5A:
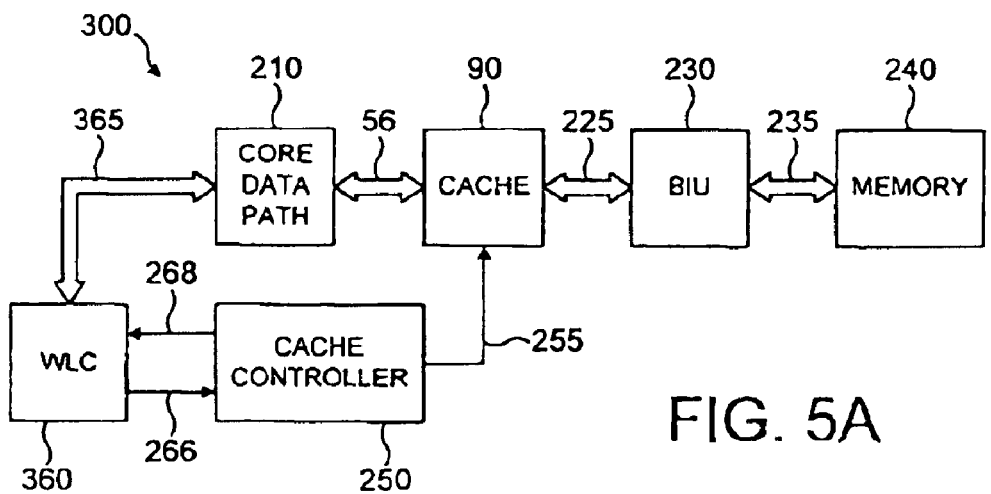
FIG. 5A illustrates the arrangement of a data processing apparatus according to a second embodiment of the present invention which incorporates a second embodiment of the way lookup cache.
Figure 5B:
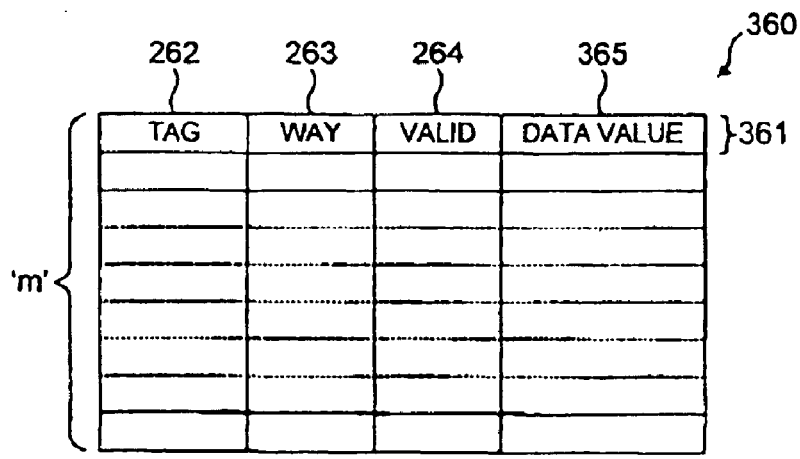
FIG. 5B illustrates the arrangement of the second embodiment of the way lookup cache.

The way lookup cache 360 is illustrated in more detail in FIG. 5B. The way lookup cache 360 has a number of entries. The number of entries is preferably set to be equal to the number of sets in the cache 90. Hence, for a 'n' way set associative cache 90 having 'm' sets, the number of entries in the way lookup cache 360 is set to 'm'. However, it will be appreciated that the number of entries may be adjusted depending on the particular design constraints. Each entry 361 in the way lookup cache 360 is associated with a data value. Each entry 361 has a TAG field 262, a cache way field 263, a valid bit field 264 and a data value field 365. The TAG 262 field stores the TAG portion 10 of the memory address 47 of the data value associated with that entry. The cache way field 263 stores a number indicating the cache way storing that data value. The data value field 365 stores the data value associated with the memory address 47. The valid bit field 264 indicates whether that particular entry in the way lookup cache 360 is valid or not. In this embodiment, only data values which would be stored at the first location in a cache line have their data values stored in the data value field 365. It will be appreciated that because an access to a first word in a cache line is usually determined to be a non-sequential access then storing the first word is beneficial.

The data path 366 enables, when it is determined that a data value the subject of a non-sequential access is stored in the way lookup cache 360, that data value to be provided directly to the core data path 210 without the need to access the cache 90. Accordingly, in these circumstances, the operation of the cache 90 can be suppressed.

The operation of the data processing apparatus 300 incorporating the way lookup cache 360 when responding to an access request will now be explained with reference to FIGS. 7A to 7C.

Figure 7A:
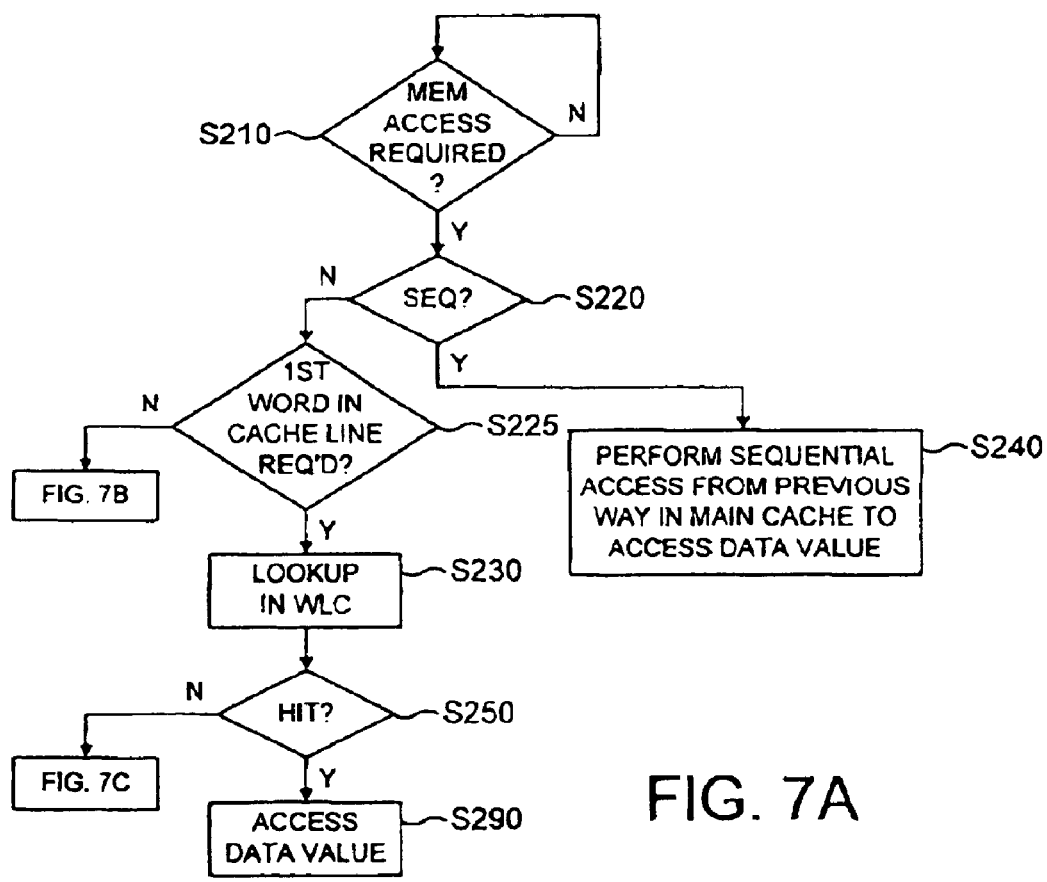
FIGS. 7A to 7C are flow diagrams illustrating the operation of the data processing apparatus of FIG. 5A in response to an access request.

In FIG. 7A, at step S210, a memory access request is awaited. When the core data path 210 requires to access a data value, it initiates an access request by placing the memory address 47 of the data value on the processor address bus 54 of FIG. 3 and a control signal on a control bus (not shown). The control bus carries information such as whether the request specifies instruction or data, read or write, word, half word or byte. On receipt of the memory access request processing proceeds to step S220.

At step S220, it is determined whether or not the memory access request is a sequential or non-sequential memory access. In this embodiment, the core data path 210 provides to the cache controller 250 over a path (not shown) an indication of whether the memory access request is sequential or non-sequential in accordance with the rule-set described above.

However, it will be appreciated that cache controller 250 could instead determine whether the memory access request is sequential or non-sequential by providing a previous address register, a previous data value size type register and a previous cache way register. The previous address register stores the memory address 47 and the previous data value size register stores information specified by the control signal (such as whether the access request is for a word, half word, byte, double word, etc.) for the previous or immediately preceding access request to that cache. These two registers can then be used to determine whether or not a particular access request is sequential or non-sequential. The previous cache way register stores a cache way indication provided by the way lookup cache 360 for the previous or immediately preceding access request to that cache. This register can then be used when dealing with sequential access requests.

When the above-described registers are provided, the memory address and the data value size of the current or present access request is compared with the contents of the previous address register and the previous data value size register. If the registers have no contents, such as would occur on a first access request then that access request is a non-sequential access request and processing would proceed to step S225. In all other circumstances, if the comparison indicates a sequential access then processing would proceed to step S240, otherwise, a non-sequential access is assumed and processing proceeds to step S225.

As mentioned above, in this embodiment, the core data path 210 provides to the cache controller 250 over a path (not shown) an indication of whether the memory access request is sequential or non-sequential. If the indication is a non-sequential access request then processing proceeds to step S225. If the indication is a sequential access request then processing proceeds to step S240.

At step S240, the cache controller 250 controls a sequential access to the cache 90.

As mentioned previously, in this embodiment, each component of the cache access logic (e.g. each way of the TAG memory 115, each of the comparators 111 and the cache way selector 113) has an enable input (not shown). When the enable input is set the components are energised and operate. Conversely, when the enable input is cleared the components cease to operate. Each way of the data memory 117 also has an enable input and these are driven by the output of the way selector 113 such that only the selected way operates. When the enable input of the cache way selector 113 is cleared, the output provided by the cache way selector 113 is maintained such that the currently selected way continues to operate. Hence, at step S240, the cache controller 250 causes the enable inputs to the cache access logic to be cleared and the enable input of the currently selected way is maintained.

It will be appreciated that in embodiments which utilised the previous way register and which did not provide enable inputs, at step S240, the cache controller 250 could control a sequential access to the cache 90 in the cache way identified by the previous way register. The cache controller 250 would send a signal over path 255 to the cache 90 to suppress the operation of the cache access logic and the cache ways not identified by the previous way register by causing their enable inputs to be cleared.

In either case, the cache 90 receives the memory address 47 of the data value to be accessed from the processor address bus 54. The SET, WORD and BYTE portions 20, 30, 40 of the memory address 47 identifies a data value in the cache way of the data memory 117, which is accessed by the core data path 210 over the data bus 56. It will be appreciated that in a read operation, the data value is provided to the core data path 210 from the cache 90 over the data bus 56. Whereas, in a write operation, the data value is provided to the cache 90 from the core data path 210 over the data bus 56. Processing returns to step S210 to await the next memory access request.

At step S225, for non-sequential access requests, the cache controller 250 determines from the memory address 47 whether the data value to be accessed is a data value that would be stored as the first word in a cache line of the cache 90. If the data value is one that would be stored as the first word in a cache line then it may be directly accessible from the word lookup cache 360 and so processing proceeds to step S230. If the data value is not one that would be stored as the first word in a cache line then, whilst it may not be possible to directly access this from the word lookup cache 360, the way lookup cache 360 may still identify the cache way storing this data value and processing proceeds to step S330 in FIG. 7B.

At step S230, the TAG portion 10 and SET portion 20 of the memory address 47 of the data value to be accessed is passed to the way lookup cache 360 over path 268. The SET portion 20 specifies an entry in the way lookup cache 360 and the TAG field 262 of that entry is compared with the TAG portion 10 of the memory address 47 and processing proceeds to step S250.

At step S250, it is determined whether or not the TAG field 262 of that entry in the way lookup cache 360 matches the TAG portion 10 of the memory address 47. If a match occurs and the valid bit for that entry is set then a 'hit' has occurred and processing proceeds to step S290. If no match occurs or if a match occurs and the valid bit is not set then a 'miss' has occurred and processing proceeds to step S470 in FIG. 7C.

At step S290, when a hit occurs in the way lookup cache 360 for a data value which would be stored as the first word in a cache line, the data value can be accessed directly in the way lookup cache 360 over the path 365.

Hence, for a memory access comprising a read operation, the operation of the cache 90 can be suppressed by causing none of the enable inputs of the cache 90 to be set and the core data path 210 can instead read the data value directly from the way lookup cache 360.

For a memory access comprising a write operation, the data value stored in the way lookup cache 360 can be overwritten by the core data path 210. Subsequently, the cache 90 and memory 240 may also be updated to store the data value depending on the cache update policy adopted.

At step S470, when a miss occurs in the way lookup cache 360 for a data value which would be stored as the first word in a cache line, the cache controller 250 will instead perform a non-sequential access in the main cache 90. Accordingly, the TAG memory 115 and data memory 117 in each cache way receives, from the core data path 210, the memory address 47 of the data value to be accessed. The TAG memory 115 outputs the TAG value stored at the location specified by SET portion 20 of the memory address 47 to the associated comparator 111. Each comparator 111 then compares the TAG value output from that cache way with the TAG portion 10 of the memory address 47 placed on the processor address bus 54 and processing proceeds to step S480.

At step S480 it is determined whether or not a hit has occurred when accessing the cache 90. If the TAG value and TAG portion 10 match and the valid bit is set then a hit signal (e.g. a logic '1') is sent to the way selector 113. The way selector 113 then indicates a cache hit on path 120 to the cache controller 250. Processing then proceeds to step S490 if a hit occurs or to step S500 if a miss occurs.

The following assumes a linefill is performed to the cache 90 on a miss during read or write. However, it will be appreciated that the linefill could be omitted during write and instead the data value could be written directly to memory 240.

At step S500, the BIU 230 will initiate a linefill from the memory 240. The memory 240 then outputs on bus 235 all the data values for the cache line which includes the address specified. The cache controller 250 will determine in which cache way the linefill is to occur in accordance with well-known cache fill policies. The BIU 230 will then pass these data values from bus 235 to bus 225, where they are stored in the cache 90.

For a read operation, the data value requested is placed on the data bus 56 and over path 268 in parallel with the linefill operation and processing proceeds to step S490 where the data value is accessed.

At step S490, the data value is accessed.

For a read operation, the data value on the data bus 56 is accessed by the core data path 210.

For a write operation, an entry in the data memory 117 to store the data value is identified by the SET portion 20, WORD portion 30 and BYTE portion 40 of the address 47 in the cache way identified by the way selector 113. The data value is then written to the entry in the identified cache way.

Processing then proceeds to step S510 where details of the data value accessed are stored in the way lookup cache 360.

At step S510, the cache controller 250 performs a linefill to the way lookup cache 360. The linefill causes data to be entered in the TAG field 262, the cache way field 263, the data value field 365 and the valid bit field 264 of one of the entries 361. In embodiments where the number of entries in the way lookup cache 360 equals the number of SETs in each cache way, the data can only be stored in the entry of the way lookup cache 360 which corresponds to the SET portion 20 of the memory address 47 of the data value being accessed. Once the entry is selected, the TAG portion 10 of the memory address 47 of the data value accessed is written to the TAG field 262. Also, the cache way selected by the cache controller to store that data value is written to the cache way field 263. Finally, the data value stored as the first word of the corresponding cache line in the cache 90 is written to the data value field 365 and the valid bit field 264 for that entry is set. Processing returns to step S210 to await the next memory access request.

Whilst, when at step S40 it is determined that a cache miss has occurred when accessing the cache 90, the subsequent steps S500, S490 and S510 are illustrated as being sequential, it will be appreciated that because the data value is made available to the data bus 56 and passed to the way lookup cache 360 in parallel with the linefill occurring, then steps S490 and S510 need not be subsequent steps but could instead occur at the same time at step S500.

Figure 7B:
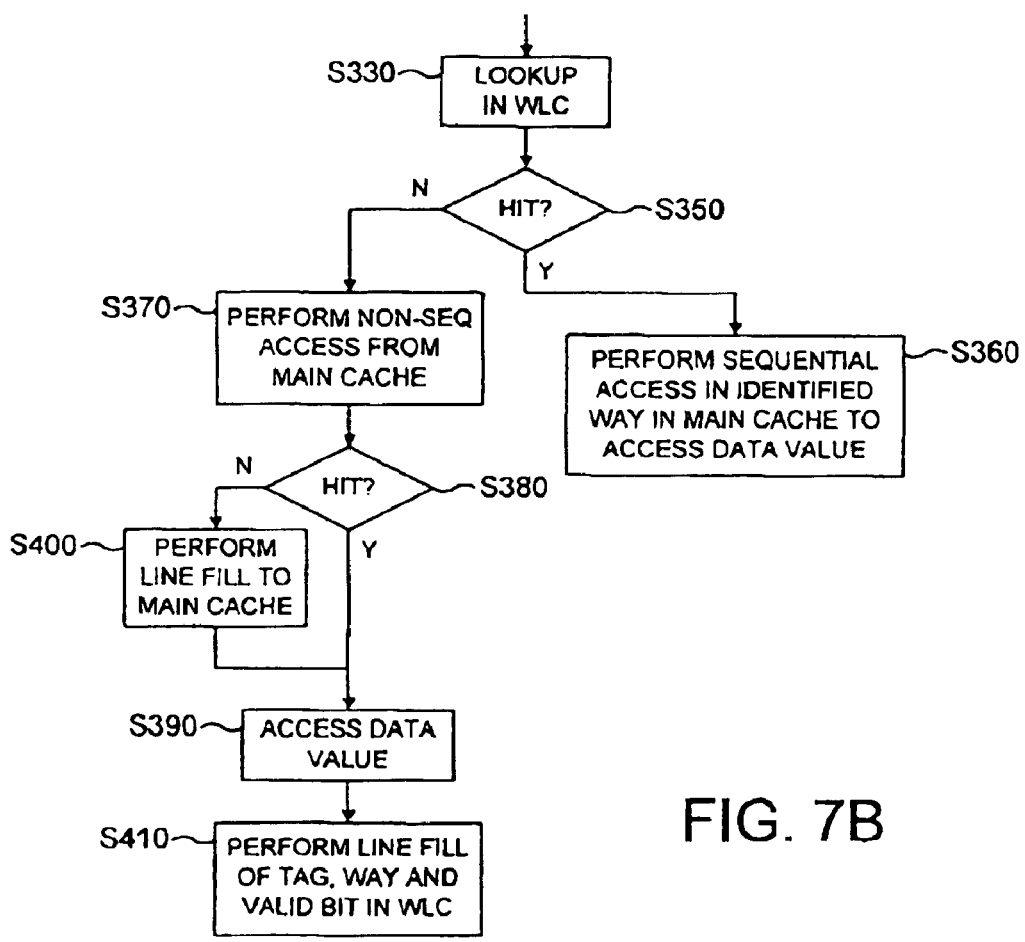
Figure 7C:
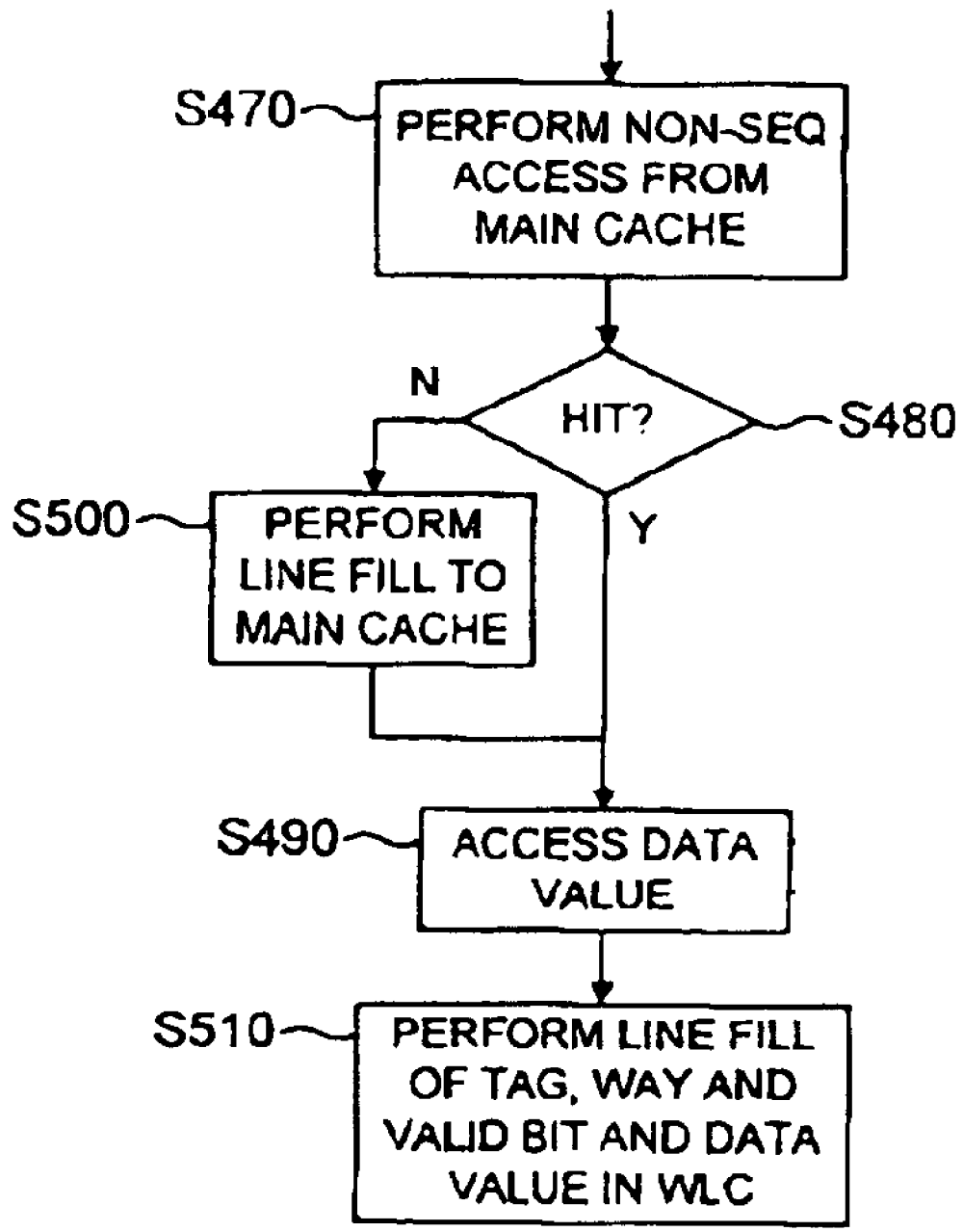

At step S330 of FIG. 7B, when the data value is not one that would be stored as the first word in a cache line, but where the way lookup cache 360 may still identify the cache way storing this data value, the TAG portion 10 and SET portion 20 of the memory address 47 of the data value to be accessed are passed to the way lookup cache 360 over path 268. The SET portion 20 specifies an entry in the way lookup cache 360 and the TAG field 262 of that entry is compared with the TAG portion 10 of the memory address 47 and processing proceeds to step S350.

At step S350, it is determined whether or not the TAG field 262 of that entry in the way lookup cache 360 matches the TAG portion 10 of the memory address 47. If a match occurs and the valid bit for that entry is set then a 'hit' has occurred and processing proceeds to step S360. If no match occurs or if a match occurs and the valid bit is not set then a 'miss' has occurred and processing proceeds to step S370.

At step S360, when it is determined that the cache way of the data value to be accessed is stored in the way lookup cache 360, the contents of the cache way field 263 of the matching entry are passed from the way lookup cache 360 to the cache controller 250 over path 266. Where a previous cache way register is provided, the contents of the cache way field 263 are then stored in the previous cache way register. The cache controller 250 causes the enable inputs to the cache access logic to be cleared and forces the output of the cache way selector 113 to correspond to the cache way indicated by the contents of the matching cache way field 263 such that only that cache way operates. The cache 90 receives the memory address 47 of the data value to be accessed from the processor address bus 54. The SET, WORD and BYTE portions 20, 30, 40 of the memory address 47 identifies a data value in the cache way of the data memory 117 identified by the way lookup cache 360, which is accessed by the core data path 210 over the data bus 56. It will be appreciated that in a read operation, the data value is provided to the core data path 210 from the cache 90 over the data bus 56. Whereas, in a write operation, the data value is provided to the cache 90 from the core data path 210 over the data bus 56. Processing returns to step S10 to await the next memory access request.

At step S370, when it is determined that the cache way of the data value to be accessed is not stored in the way lookup cache 360, then the cache controller 250 causes a non-sequential access to the cache 90 and the enable inputs to the cache access logic are set. Accordingly, the TAG memory 115 and data memory 117 in each cache way receives, from the core data path 210, the memory address 47 of the data value to be accessed. The TAG memory 115 outputs the TAG value stored at the location specified by SET portion 20 of the memory address 47 to the associated comparator 111. Each comparator 111 then compares the TAG value output from that cache way with the TAG portion 10 of the memory address 47 placed on the processor address bus 54 and processing proceeds to step S380.

At step S380 it is determined whether or not a hit has occurred when accessing the cache 90. If the TAG value and TAG portion 10 match and the valid bit is set then a hit signal (e.g. a logic '1') is sent to the way selector 113. The way selector 113 then indicates a cache hit on path 120 to the cache controller 250. Processing then proceeds to step S390 if a hit occurs or to step S400 if a miss occurs.

The following assumes a linefill is performed to the cache 90 on a miss during read or write. However, it will be appreciated that the linefill could be omitted during write and instead the data value could be written directly to memory 240.

At step S400, the BIU 230 will initiate a linefill from the memory 240. The memory 240 then outputs on bus 235 all the data values for the cache line which includes the address specified. The cache controller 250 will determine in which cache way the linefill is to occur in accordance with well-known cache fill policies. The BIU 230 will then pass these data values from bus 235 to bus 225, where they are stored in the cache 90.

For a read operation, the data value requested is placed on the data bus 56 and over path 268 in parallel with the linefill operation and processing proceeds to step S90 where the data value is accessed.

At step S390, the data value is accessed.

For a read operation, the data value on the data bus 56 is accessed by the core data path 210.

For a write operation, an entry in the data memory 117 to store the data value is identified by the SET portion 20, WORD portion 30 and BYTE portion 40 of the address 47 in the cache way identified by the way selector 113. The data value is then written to the entry in the identified cache way.

Processing then proceeds to step S410 where details of the data value accessed are stored in the way lookup cache 360.

At step S410, the cache controller 250 performs a linefill to the way lookup cache 360. The linefill causes data to be entered in the TAG field 262, the cache way field 263 and the valid bit field 264 of one of the entries 261. In embodiments where the number of entries in the way lookup cache 360 equals the number of SETs in each cache way, the data can only be stored in the entry of the way lookup cache 360 which corresponds to the SET portion 20 of the memory address 47 of the data value being accessed. Once the entry is selected, the TAG portion 10 of the memory address 47 of the data value accessed is written to the TAG field 262. Also, the cache way selected by the cache controller to store that data value is written to the cache way field 263. Finally, the data value stored as the first word of the corresponding cache line in the cache 90 is written to the data value field 365 and the valid bit field 264 for that entry is set. Processing returns to step S10 to await the next memory access request.

Whilst, when at step S380 it is determined that a cache miss has occurred when accessing the cache 90, the subsequent steps S400, S390 and S410 are illustrated as being sequential, it will be appreciated that because the data value is made available to the data bus 56 and passed to the way lookup cache 360 in parallel with the linefill occurring, then steps S390 and S410 need not be subsequent steps but could instead occur at the same time at step S400.

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

We claim:

1. A data processing apparatus comprising:
   an 'n' way set-associative cache, each cache way having a plurality of entries for storing a corresponding plurality of data values;
   a cache controller operable on receipt of an access request for a data value to determine whether that data value is accessible within said cache, said cache comprising cache access logic operable under the control of said cache controller to determine whether a data value the subject of an access request is accessible in one of said cache ways;
   a way lookup cache arranged to store an indication of the cache way in which a number of said plurality of data values stored in said cache are accessible; and
   said cache controller being operable, only when an access request for a data value specifies a non-sequential access, to reference said way lookup cache to determine whether that data value is identified in said way lookup cache and, if so, said cache controller being further operable to suppress the operation of said access logic and to cause that data value to be accessed.

2. The data processing apparatus of claim 1, wherein when an access request for a data value specifies a non-sequential access, said cache controller is further operable to cause that data value to be accessed in the cache way identified by said way lookup cache.

3. The data processing apparatus of claim 2, wherein when said data value is identified in said way lookup cache, said cache controller is operable to cause only the cache way identified by said way lookup cache to be accessed.

4. The data processing apparatus of claim 1, wherein each of said number of said plurality of data values is associated with an entry in said way lookup cache, each entry including an indication of the cache way storing said data value, said cache controller being operable to determine whether said access request specifies a data value associated with an entry in said way lookup cache and, if so, to cause that data value to be accessed.

5. The data processing apparatus of claim 4, wherein the access request specifies a memory address for the data value, each entry includes an indication of a memory address and said cache controller is operable to determine whether said memory address specified by the access request corresponds to a memory address indication of an entry in said way lookup cache and, if so, to cause the data value associated with said memory address to be accessed in said cache way identified by said entry.

6. The data processing apparatus of claim 4, wherein each entry includes an indication of a data value associated with a memory address and said cache controller is operable when said access request specifies a memory address associated with a data value of an entry in said way lookup cache to cause the data value associated with said memory address to be accessed in that entry of said way lookup cache and to suppress the operation of said set-associative cache.

7. The data processing apparatus of claim 4, wherein said 'n' way set-associative cache comprises 'm' sets and said way lookup cache comprises up to '$m/2^x$' entries, where 'x' is a positive integer.

8. The data processing apparatus of claim 4, wherein said 'n' way set-associative cache comprises 'm' sets and said way lookup cache comprises 'm' entries.

9. The data processing apparatus of claim 4, wherein if said cache controller determines that said data value is not identified in said way lookup cache, said cache controller is operable to control said cache access logic to determine whether said data value is accessible in one of said cache ways and, if so, to store in one of said entries in said way lookup cache an indication of the cache way in which said data value is accessible.

10. The data processing apparatus of claim 9, wherein said cache controller is further operable to store in said one of said entries of said way lookup cache a memory address indication associated with said data value.

11. The data processing apparatus of claim 10, wherein said cache controller is further operable to store in said one of said entries of said way lookup cache an indication of said data value.

12. The data processing apparatus of claim 1, wherein said data processing apparatus is operable to provide said cache controller with an indication of whether said access request for a data value specifies a non-sequential access.

13. The data processing apparatus of claim 1, wherein said cache controller is operable to compare said access request with the preceding access request to determine whether said access request for a data value specifies a non-sequential access.

14. The data processing apparatus of claim 13, wherein said access request specifies a memory address and a data value size indication and said cache controller is operable to compare said memory address and said data value size indication with the preceding access request and data value size indication to determine whether said access request for a data value specifies a non-sequential access.

15. The data processing apparatus of claim 1, wherein each cache way comprises a plurality of cache lines and said cache controller is operable to determine that said access request is a non-sequential access if said access request comprises an access to a cache line which is different to a cache line accessed by the preceding access request.

16. The data processing apparatus of claim 1, wherein said cache controller comprises a register operable to store said cache way identified by said way lookup cache, said cache controller being further operable when an access request for a data value specifies a sequential access, to reference said register, to suppress the operation of said access logic and to cause that data value to be accessed in said cache way identified by said register.

17. In a data processing apparatus comprising:
   an 'n' way set-associative cache, each cache way having a plurality of entries for storing a corresponding plurality of data values;
   a cache controller operable on receipt of an access request for a data value to determine whether that data value is accessible within said cache, said cache comprising cache access logic operable under the control of said cache controller to determine whether a data value the subject of an access request is accessible in one of said cache ways; and
   a way lookup cache arranged to store an indication of the cache way in which a number of said plurality of data values stored in said cache are accessible, a method of accessing a data value comprising the steps of:
   a) determining whether an access request for a data value specifies a non-sequential access and, if so;
   b) referencing said way lookup cache to determine whether that data value is identified in said way lookup cache and, if so;
   c) suppressing the operation of said access logic and causing that data value to be accessed.

18. The method of claim 17, wherein step c) further comprises the step of:
   accessing that data value in the cache way identified by said way lookup cache.

19. The method of claim 18, wherein step c) further comprises the step of:
   causing only the cache way identified by said way lookup cache to be accessed.

20. The method of claim 17, wherein each of said number of said plurality of data values is associated with an entry in said way lookup cache, each entry including an indication of the cache way storing said data value, step b) comprises the step of:
   referencing said way lookup cache to determine whether said access request specifies a data value associated with an entry in said way lookup cache and, if so; step c) comprises the step of:
   causing that data value to be accessed.

21. The method of claim 20, wherein the access request specifies a memory address for the data value, each entry includes an indication of a memory address, step b) comprises the step of:
   referencing said way lookup cache to determine whether said memory address specified by the access request corresponds to a memory address indication of an entry in said way lookup cache and, if so; step c) comprises the step of:
   causing the data value associated with said memory address to be accessed in said cache way identified by said entry.

22. The method of claim 20, wherein each entry includes an indication of a data value associated with a memory address, step b) comprises the step of:
   referencing said way lookup cache to determine whether said access request specifies a memory address associated with a data value of an entry in said way lookup cache and, if so; step c) comprises the step of:
   suppressing the operation of said set-associative cache and causing the data value associated with said memory address to be accessed in that entry of said way lookup cache.

23. The method of claim 20, wherein said 'n' way set-associative cache comprises 'm' sets and said way lookup cache comprises up to '$m/2^x$' entries, where 'x' is a positive integer.

24. The method of claim 20, wherein said 'n' way set-associative cache comprises 'm' sets and said way lookup cache comprises 'm' entries.

25. The method of claim 20, wherein if step b) determines that said data value is not identified in said way lookup cache, said method further comprises the steps of:
   d) controlling said cache access logic to determine whether said data value is accessible in one of said cache ways; and, if so,
   e) storing in one of said entries in said way lookup cache an indication of the cache way in which said data value is accessible.

26. The method claim 25, further comprising the step of:
   f) storing in said one of said entries of said way lookup cache a memory address indication associated with said data value.

27. The method of claim 26, further comprising the step of:
   g) storing in said one of said entries of said way lookup cache an indication of said data value.

28. The method of claim 17, wherein step a) comprises the step of:
   receiving an indication of whether said access request for a data value specifies a non-sequential access.

29. The method of claim 17, wherein step a) comprises the step of:
   determining whether an access request for a data value specifies a non-sequential access by comparing said access request with the preceding access request.

30. The method of claim 29, wherein said access request specifies a memory address and a data value size indication and step a) comprises the step of:
   determining whether an access request for a data value specifies a non-sequential access by comparing said memory address and said data value size indication with the preceding access request and data value size indication.

31. The method of claim 17, wherein each cache way comprises a plurality of cache lines and step a) comprises the steps of:
   determining that an access request for a data value specifies a non-sequential access if said access request comprises an access to a cache line which is different to a cache line accessed by the preceding access request.

32. The method of claim 17, wherein said cache controller comprises a register operable to store said cache way identified by said way lookup cache, and said method, when an access request for a data value specifies a sequential access, further comprises the steps of:
   h) referencing said register, suppressing the operation of said access logic and causing that data value to be accessed in said cache way identified by said register.

* * * * *